(12) United States Patent
Lehr et al.

(10) Patent No.: US 8,745,349 B2
(45) Date of Patent: Jun. 3, 2014

(54) CONSOLIDATING CONTROL AREAS

(75) Inventors: Douglas L. Lehr, Austin, TX (US); Franklin E. McCune, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 13/181,383

(22) Filed: Jul. 12, 2011

(65) Prior Publication Data
US 2013/0019070 A1 Jan. 17, 2013

(51) Int. Cl.
*G06F 12/00* (2006.01)
*G06F 11/14* (2006.01)
(52) U.S. Cl.
CPC ............ *G06F 12/00* (2013.01); *G06F 11/1458* (2013.01)
USPC ........... 711/165; 711/100; 711/101; 711/154; 711/170; 711/202; 711/203; 711/205; 711/206; 711/207; 711/209; 711/E12.001; 711/E12.002; 711/E12.005

(58) Field of Classification Search
CPC ............................ G06F 12/00; G06F 11/1458
USPC ......... 711/100, 101, 154, 165, 170, 202, 203, 711/205, 206, 207, 209, E12.001, E12.002, 711/E12.005
See application file for complete search history.

(56) References Cited

U.S. PATENT DOCUMENTS

2009/0049110 A1 2/2009 Plow et al.

*Primary Examiner* — Midys Rojas
(74) *Attorney, Agent, or Firm* — Kunzler Law Group

(57) ABSTRACT

A detection module selects logically adjacent first and second control areas of a cluster. The detection module further determines that the first and second control areas satisfy a migration test wherein the first control area has free space exceeding a free threshold, the free space is at least equal to a space requirement for each second control area control interval, and the second control area has fewer control intervals than a control interval threshold. In addition, a copy module copies each second control area control interval to the first control area in response to determining that the first and second control areas satisfy the migration test.

20 Claims, 4 Drawing Sheets

CONSOLIDATING CONTROL AREAS

FIELD

The subject matter disclosed herein relates to control areas and more particularly relates to consolidating control areas.

BACKGROUND

Description of the Related Art

A Virtual Storage Access Method (VSAM) cluster data set may be repeatedly updated, resulting in fragmentation across a plurality of control areas. As a result, the free space of a cluster is reduced and data access times may be degraded.

BRIEF SUMMARY

From the foregoing discussion, it should be apparent that a need exists for a method and apparatus that consolidates control areas. Beneficially, such a method and apparatus would increase free space in a storage volume.

The present invention has been developed in response to the present state of the art, and in particular, in response to the problems and needs in the art that have not yet been fully solved by currently available control area consolidation methods. Accordingly, the present invention has been developed to provide a method and apparatus for consolidating control areas that overcome many or all of the above-discussed shortcomings in the art.

A method for consolidating control areas selects logically adjacent first and second control areas of a cluster. The method further determines that the first and second control areas satisfy a migration test wherein the first control area has free space exceeding a free threshold, the free space is at least equal to a space requirement for each second control area control interval, and the second control area has fewer control intervals than a control interval threshold. In addition, the method copies each second control area control interval to the first control area in response to determining that the first and second control areas satisfy the migration test. An apparatus and computer program product also perform the functions of the method.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
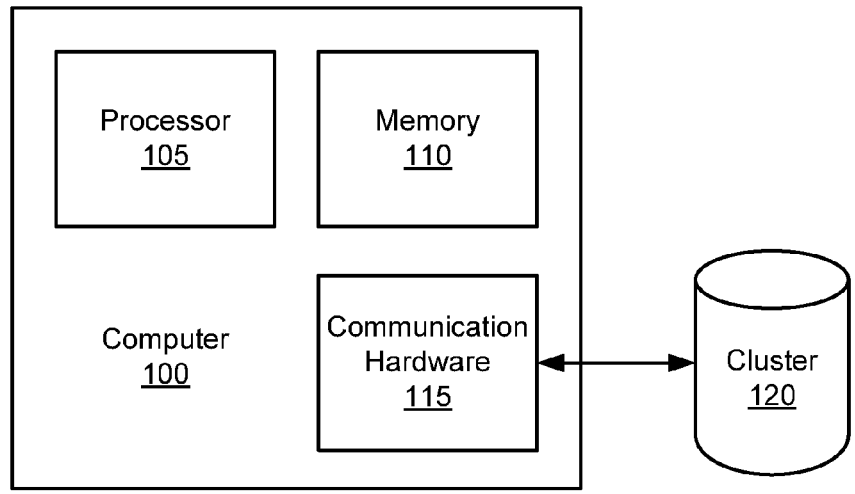
FIG. 1 is a schematic block diagram illustrating one embodiment of a computing system.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a computing system 125. The computing system 125 includes a computer 100 and a cluster 120. The computer 100 includes a processor 105, a memory 110, and communication hardware 115. The memory 110 may be a computer readable storage medium storing computer readable program code. The processor 105 may execute the computer readable program code. The processor 105 may communicate with other devices through the communication hardware 115.

Although a single cluster 120 is depicted, the computing system 125 may include a plurality of clusters 120. The cluster 120 may include a plurality of computer readable storage medium. The cluster 120 may include hard disk drives, semiconductor storage devices, optical storage devices, holographic storage devices, micromechanical storage devices, and/or combinations thereof. The cluster 120 may be organized as a plurality of volumes. In one embodiment, the cluster 120 is organized as a plurality of virtual volumes. An index may locate logical records, control intervals, and control areas within the cluster 120 using key values.

The processor 105 may read data from and write data to the cluster 120 through the communication hardware 115. In one embodiment, the cluster 120 is organized as VSAM clusters. In addition, data may be stored on the cluster 120 as Key Sequenced Data Sets (KSDS). Alternatively, the cluster 120 may store data as Entry Sequenced Data Sets (ESDS). In a certain embodiment, the cluster 120 may store data as Relative Record Data Sets (RSDS). One organization of data sets on the VSAM cluster 120 is described in FIGS. 3 and 4.

Figure 2:
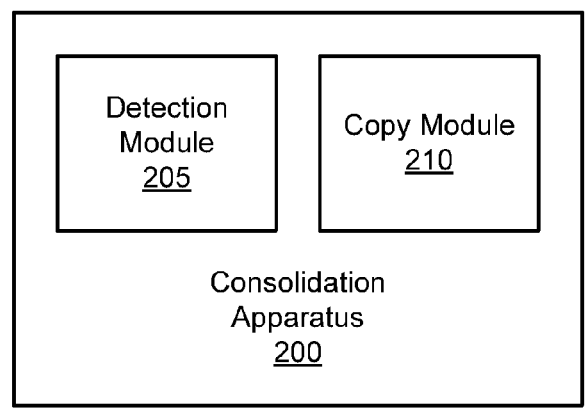
FIG. 2 is a schematic block diagram illustrating one embodiment of a consolidation apparatus.

FIG. 2 is a schematic block diagram illustrating one embodiment of a consolidation apparatus 200. The apparatus 200 may be embodied in the computer 100 FIG. 1. The description of the apparatus 200 refers to elements of FIG. 1, like numbers referring to like elements. The apparatus 200 includes a detection module 205 and a copy module 210. The detection module 205 and the copy module 210 may be embodied in a computer program product comprising a computer readable storage medium storing computer readable program code executed by the processor 105.

The detection module 205 selects logically adjacent first and second control areas of the cluster 120. In addition, the detection module 205 determines that the first and second control areas satisfy a migration test wherein the first control area has free space exceeding a free threshold, the free space is at least equal to a space requirement for each second control area control interval, and the second control area has fewer control intervals than a control interval threshold. The copy module 210 copies each second control area control interval to the first control area in response to determining that the first and second control areas satisfy the migration test.

Figure 3:
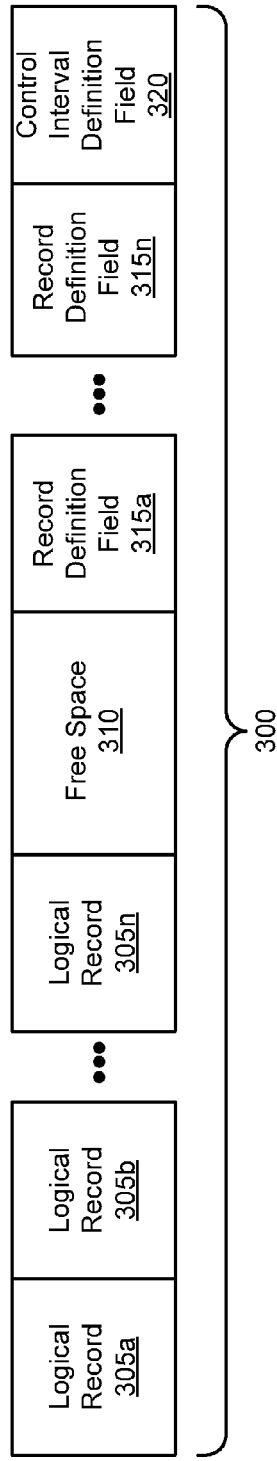
FIG. 3 is a schematic block diagram illustrating one embodiment of a control interval.

FIG. 3 is a schematic block diagram illustrating one embodiment of a control interval 300. In one embodiment, the cluster 120 includes a plurality of control areas. Each control area may comprise plurality of control intervals 300. The description of the control interval 300 refers to elements of FIGS. 1-2, like numbers referring to like elements. The control interval 300 includes logical records 305, interval free space 310, record definition fields 315, and a control interval definition field 320.

In one embodiment, each logical record 305 is referenced by a key value and a key offset. Each key value length may be the same. In addition, each key value may be unique. It a logical record 305 may store data. The data may be accessed using a sequential access, a direct access, and/or a skip-sequential access.

The interval free space 310 may be available to store additional data. The record definition fields 315 may define logical records. The control interval definition fields 320 may define the control interval 300.

Figure 4:
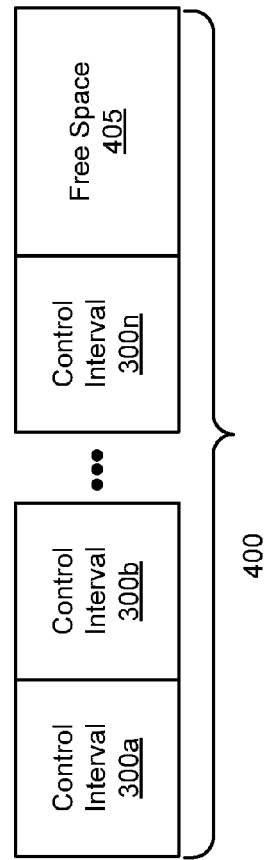
FIG. 4 is a schematic block diagram illustrating one embodiment of a control area.

FIG. 4 is a schematic block diagram illustrating one embodiment of a control area 400. The cluster 120 of FIG. 1 may be organized as a plurality of control areas 400. The description of the control area 400 refers to elements of FIGS. 1-3, like numbers referring to like elements.

The control area 400 comprises a plurality of control intervals 300. In addition, the control area 400 may include free space 405. A data set may be written as a plurality of control intervals 300 in the control area 400. As data is added to the data set, the data set may be split between two or more control areas 400. In addition, as the data set is modified, the control intervals 300 of other control areas 400 may be employed to store the data set. Thus over time, the free space 405 of the control area 400 may increase.

In one embodiment, only data of a first data set may be written to the control area 400. As a result, as fragmentation increases the free space 405 of the control area 400, the available storage space of the cluster 120 may be decreased. The embodiments described herein consolidate control intervals 300 of a data set into a control area 400 to increase the available storage space of the cluster 120. In addition, consolidating the control intervals 300 may improve performance of the system 100.

Figure 5:
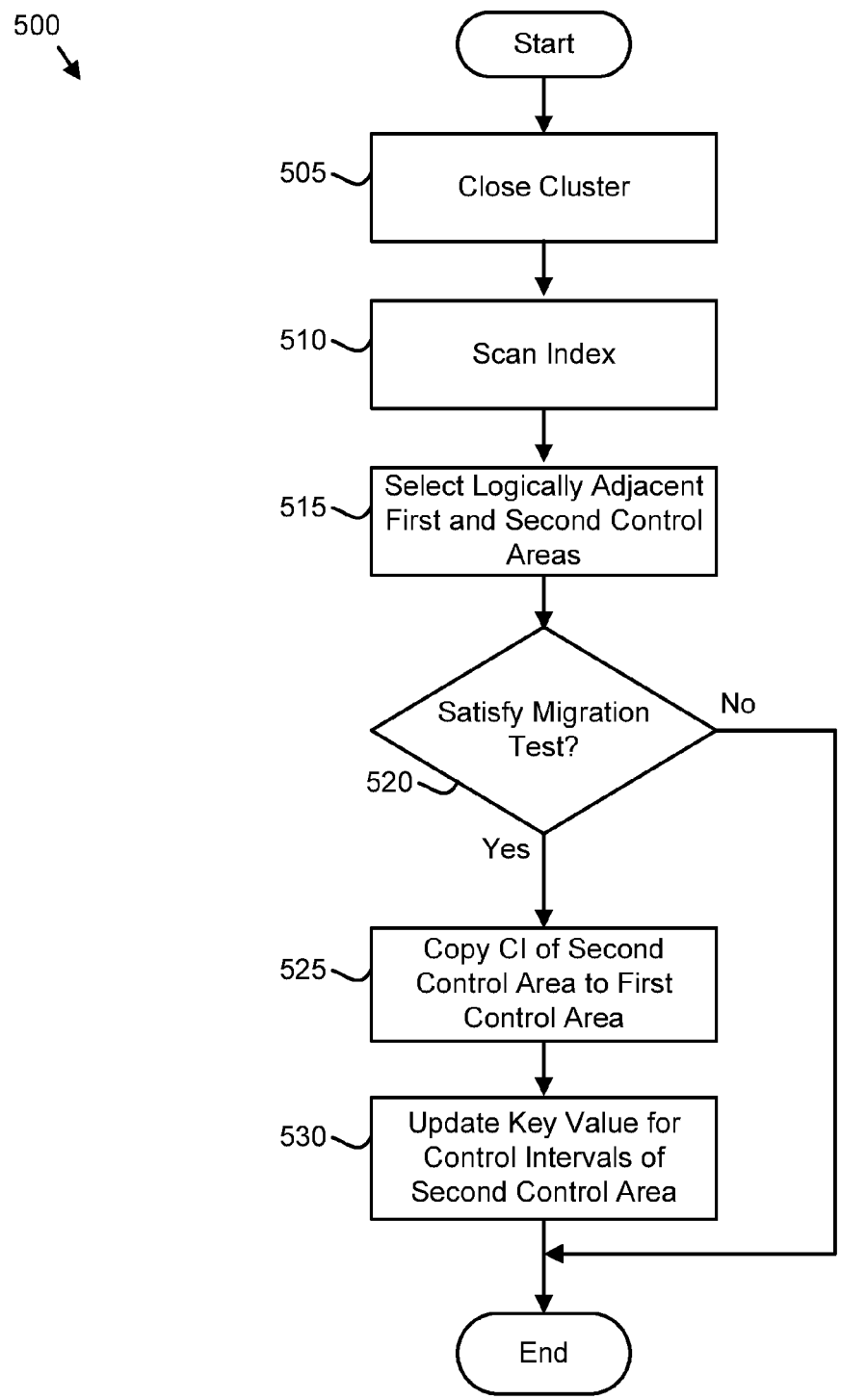
FIG. 5 is a schematic flow chart diagram illustrating one embodiment of a consolidation method.

FIG. 5 is a schematic flow chart diagram illustrating one embodiment of a consolidation method 500. The method 500 may perform the functions of the apparatus 200 of FIG. 2. The description of the method 500 refers to elements of FIGS. 1-4, like numbers referring to like elements.

In one embodiment, the method 500 is performed by a processor 105. Alternatively, the method 500 may be performed by a computer program product comprising computer readable program code stored on a computer readable storage medium.

The method 500 starts, and in one embodiment, the detection module 205 closes 505 the cluster 120. The computer 100 may be unable to write to the cluster 120 while the cluster 120 is closed.

The detection module 205 may further scan 510 the index of the cluster 120. In addition, the detection module 205 selects 515 logically adjacent first and second control areas 400 of the cluster 120. In one embodiment, logically adjacent control areas 400 have sequential key values, index values, and the like. For example, a key value of the first control area 400 may immediately logically precede a key value of the second control area 400. The detection module 205 does not select control areas 400 that are not logically adjacent.

In addition, the detection module 205 determines 520 that the first and second control areas 400 satisfy a migration test. The migration test may include a plurality of elements. In one embodiment, each element must be satisfied to satisfy the migration test.

A first element of the migration test may require that the first control area 400 has free space 405 exceeding a free threshold. In one embodiment, the free threshold is control area free space 405 in the range of 65-85% of total first control area space. In a certain embodiment, the free threshold is first control area free space of 75% of the total first control area space.

In one embodiment, the first element of the migration test is satisfied only if at least 50% of the free space 405 of the first control area 400 is from at least one delete of a control interval 300 of the first control area 400. In a certain embodiment, the detection module 205 counts deletes of control intervals 300 for the first control area 400. For example, if three control intervals 300 are deleted from the first control area 400, the detection module 205 may increment a delete count by three. Alternatively, if three control intervals 300 are deleted from the first control area 400, the detection module 205 may increment the delete count by the space occupied by the three deleted control intervals 300.

The detection module 205 may reset the delete count in response to the split of the first control area 400. For example, if the size of a first data set exceeds the size of the first control area 400, the first data set may be split and stored in two control areas 400. In response to splitting the first data set, the detection module 205 may reset the delete count to zero.

In one embodiment, the first element of the migration test is satisfied only if the delete count exceeds a delete threshold. The delete count may be a number of deletes. In one embodiment, the delete threshold is in the range of 25 to 50 deletes. Alternatively, the delete threshold may be a percentage of the free space 405 of the first control area 400. In one embodiment, the delete threshold may be in the range of 25 to 75%.

A second element of the migration test may require that the free space 405 of the first control area 400 is at least equal to a space requirement for each second control area 400 control interval 300. For example, if the control intervals 300 of the second control area 400 require 500 Megabytes (MB) of storage space, the second element may only be satisfied if the free space 405 of the first control area 400 is a least equal to 500 MB.

A third element of the migration test may require that the second control area 400 has fewer control intervals 300 than a control interval threshold. In one embodiment, the control interval threshold is in the range of two to seven control intervals 300. In a certain embodiment, the control interval threshold is three. For example, if the second control area 100 has two control intervals 300 and control interval threshold is three, the third element of the migration test is satisfied.

The detection module 205 may determine 520 that the migration test is satisfied if each element of the migration test is satisfied. If the detection module 205 determines 520 that the migration test is not satisfied, the method 500 ends. If the migration test is satisfied, the copy module 210 copies 525 each second control area 400 control interval 300 to the first control area 400 in response to determining that the first and second control areas satisfy the migration test.

In one embodiment, the copy module 210 further updates 530 the key value for each second control area 400 control intervals 300 and the method 500 ends. In addition, the copy module 210 may delete each control interval 300 from the second control area 400. The copy module 210 may update 530 the key values to reflect the new location of the control intervals 300 in the first control area 400.

Figure 6:
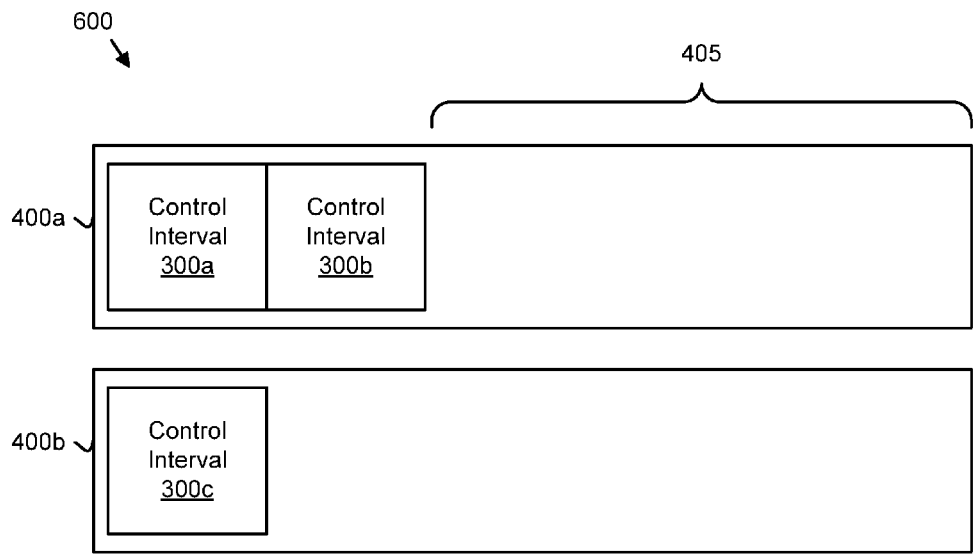
FIG. 6 is a schematic block diagram illustrating one embodiment of unconsolidated control areas.

FIG. 6 is a schematic block diagram illustrating one embodiment of unconsolidated control areas 600. The control areas 600 are exemplary of two control areas 400 of the cluster 120. The description of the unconsolidated control areas 600 refers to elements of FIGS. 1-5, like numbers referring to like elements.

A first control area 400a is depicted with two control intervals 300. The first control area 400a further comprises free space 405. A second control area 400b is depicted with one control interval 300. The first and second control areas 400a,b are logically adjacent. However, the first and second control areas 400a,b may not be physically adjacent in the cluster 120.

The detection module 205 may select 515 the first and second control areas 400*a,b* as logically adjacent. In addition the detection module 205 may determine 520 that the first and second control areas 400*a,b* satisfy the migration test.

Figure 7:
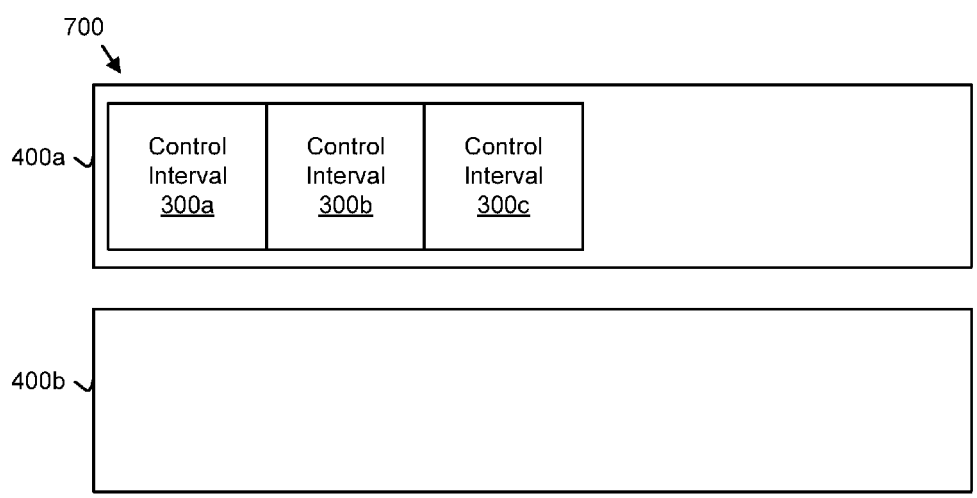
FIG. 7 is a schematic block diagram illustrating one embodiment of consolidated control areas.

FIG. 7 is a schematic block diagram illustrating one embodiment of consolidated control areas 700. The control areas 700 are the control areas 600 of FIG. 6. The description of the control areas 700 refers to elements of FIGS. 1-6, like numbers referring to like elements.

In one embodiment, the copy module 210 copies 525 each control interval 300 of the second control area 400*b* to the first control area 400*a* in response to the detection module 205 determining 520 that the first and second control areas 400*a,b* satisfy the migration test. The copy module 210 may further delete each control interval 300 from the second control area 400*b*. As a result, the control intervals 300 of the second control area 400*b* are consolidated into the first control area 400*a*.

The method 500 and apparatus 200 supports the consolidation of control intervals 300 within a first control area 400*a*. As a result, storage space within the cluster 120 is more efficiently utilized. In addition, consolidating the control intervals 300 may improve access performance when reading data from the cluster 120.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for consolidating control areas comprising:
   selecting, by use of a processor, logically adjacent first and second control areas of a cluster, wherein logically control areas have sequential key values indexing the control areas, each control area comprises control intervals, and each control interval comprises at least one logical record and free space available to store additional data;
   determining that the first and second control areas satisfy a migration test by the control intervals of the first control area having free space exceeding a free threshold, the free space being at least equal to a space requirement for all second control area control intervals, and the second control area having fewer control intervals than a control interval threshold; and
   copying each second control area control interval to the first control area in response to determining that the first and second control areas satisfy the migration test.

2. The method of claim 1, wherein the first and second control areas satisfy the migration test only if at least 50% of the free space of the first control area is available from at least one delete of a control interval of the first control area.

3. The method of claim 2, further comprising:
   counting control interval deletes for the first control area;
   resetting the delete count in response to a split of a data set of the first control area into two control areas; and
   satisfying the migration test for the first control area only if the delete count exceeds a delete threshold.

4. The method of claim 1, further comprising updating the key value for each second control area control interval in response to copying each second control area control interval to the first control area.

5. The method of claim 1, wherein the free threshold is first control area free space in the range of 65-85% of total first control area space.

6. The method of claim 1, wherein the free threshold is first control area free space of 75% of total first control area space.

7. The method of claim 1, wherein the control interval threshold is 3 control intervals.

8. The method of claim 1, further comprising:
   closing the cluster, wherein the closed cluster is unable to be written to; and
   scanning an index in response to closing the cluster.

9. The method of claim 1, wherein the cluster is a Virtual Storage Access Method (VSAM) cluster.

10. An apparatus comprising:
    a non-transitory computer readable storage medium storing computer readable program code executable by a processor, the computer readable program code comprising:
    a detection module selecting logically adjacent first and second control areas of a cluster, wherein logically adjacent control areas have sequential key values indexing the control areas, each control area comprises control intervals, and each control interval comprises at least one of a logical record and free space available to store additional data, and determining that the first and second control areas satisfy a migration test by the control intervals of the first control area having free space exceeding a free threshold, the free space being at least equal to a space requirement for all second control area control intervals, and the second control area having fewer control intervals than a control interval threshold; and
    a copy module copying each second control area control interval to the first control area in response to determining that the first and second control areas satisfy the migration test.

11. The apparatus of claim 10, wherein the first and second control areas satisfy the migration test only if at least 50% of the free space of the first control area is available from at least one delete of a control interval of the first control area.

12. The apparatus of claim 10, the detection module further closing the cluster, wherein the closed cluster is unable to be written to, and scanning an index in response to closing the cluster and the copy module further updating a key value for each second control area control interval.

13. The apparatus of claim 10, wherein the free threshold is first control area free space in the range of 65-85% of total first control area space.

14. The apparatus of claim 10, wherein the control interval threshold is 3 control intervals.

15. A computer program product for consolidating control areas, the computer program product comprising:
    a non-transitory computer readable storage medium having computer readable program code embodied therein, the computer readable program code configured to:
    select logically adjacent first and second control areas of a cluster, wherein logically adjacent control areas have sequential key values indexing the control areas, each control area comprises control intervals, and each control interval comprises at least one of a logical record and free space available to store additional data;
    determine that the first and second control areas satisfy a migration test by the control intervals of the first control area having free space exceeding a free threshold, the free space being at least equal to a space requirement for all second control area control intervals, and the second control area having fewer control intervals than a control interval threshold; and
    copy each second control area control interval to the first control area in response to determining that the first and second control areas satisfy the migration test.

16. The computer program product of claim 15, wherein the first and second control areas satisfy the migration test only if at least 50% of the free space of the first control area is available from at least one delete of a control interval of the first control area.

17. The computer program product of claim 16, computer readable program code further:
  counting control interval deletes for the first control area;
  resetting the delete count in response to a split of a data set of the first control area into two control areas; and
  satisfying the migration test for the first control area only if the delete count exceeds a delete threshold.

18. The computer program product of claim 15, the detection module further closing the cluster, wherein the closed cluster is unable to be written to, and scanning an index in response to closing the cluster and the copy module further updating a key value for each second control area control interval.

19. The computer program product of claim 15, wherein the free threshold is first control area free space in the range of 65-85% of total first control area space.

20. The computer program product of claim 15, wherein the control interval threshold is 3 control intervals.

* * * * *